(12) United States Patent
Johnston

(10) Patent No.: US 12,220,295 B2
(45) Date of Patent: Feb. 11, 2025

(54) ORTHODONTIC HYBRID BRACKET

(71) Applicant: Michael Stuart Johnston, Simpsonville, SC (US)

(72) Inventor: Michael Stuart Johnston, Simpsonville, SC (US)

( * ) Notice: Subject to any disclaimer, the term of this patent is extended or adjusted under 35 U.S.C. 154(b) by 0 days.

(21) Appl. No.: 17/455,105

(22) Filed: Nov. 16, 2021

(65) Prior Publication Data
US 2023/0149131 A1 May 18, 2023

(51) Int. Cl.
*A61C 7/28* (2006.01)

(52) U.S. Cl.
CPC .................... *A61C 7/282* (2013.01)

(58) Field of Classification Search
CPC .... A61C 7/12; A61C 7/14; A61C 7/16; A61C 7/28; A61C 7/285; A61C 7/287
See application file for complete search history.

(56) References Cited

U.S. PATENT DOCUMENTS

| | | | |
|---|---|---|---|
| 1,044,764 A * | 11/1912 | Federspiel | A61C 7/00 433/18 |
| 4,354,834 A | 10/1982 | Wilson | |
| 4,494,931 A * | 1/1985 | Wildman | A61C 7/12 433/8 |
| 4,659,309 A | 4/1987 | Merkel | |
| 5,125,831 A | 6/1992 | Pospisil | |
| 6,168,428 B1 | 1/2001 | Voudouris | |
| 6,506,049 B2 | 1/2003 | Hanson | |
| 6,554,612 B2 | 4/2003 | Georgakis et al. | |
| 6,616,444 B2 | 9/2003 | Andreiko et al. | |
| 7,204,690 B2 | 4/2007 | Hanson | |
| 7,396,230 B2 | 7/2008 | Abels et al. | |
| 8,033,824 B2 | 10/2011 | Oda et al. | |
| 8,220,195 B2 | 7/2012 | Maijer et al. | |
| 8,353,699 B2 | 1/2013 | Johnston | |
| 8,550,814 B1 | 10/2013 | Collins | |
| 10,433,933 B2 | 10/2019 | Mashouf | |
| 10,751,150 B2 | 8/2020 | Oda | |
| 10,799,324 B2 | 10/2020 | Yeh et al. | |
| 2002/0192617 A1 * | 12/2002 | Phan | A61C 19/003 433/18 |
| 2010/0129764 A1 | 5/2010 | Pospisil | |
| 2012/0028208 A1 | 2/2012 | Cleary | |
| 2015/0173859 A1 * | 6/2015 | Lin | A61C 7/287 433/10 |

(Continued)

FOREIGN PATENT DOCUMENTS

DE      102020106185 A1 *   9/2021   ............. A61C 7/006

OTHER PUBLICATIONS

Senger, Anchorage Unit for an Orthodontic Appliance, Orthodontic Appliance, and Method of Manufacturing the Anchorage Unit and the Orthodontic Appliance, 2022 (Year: 2022).*

(Continued)

*Primary Examiner* — Cris L. Rodriguez
*Assistant Examiner* — Sydney J Pulvidente
(74) *Attorney, Agent, or Firm* — Dunlap Bennett & Ludwig, PLLC

(57) ABSTRACT

An orthodontic hybrid bracket having a body dimensioned and adapted to engage a plurality of surfaces of a posterior tooth, wherein the body terminates proximal of the distal surface of the posterior tooth.

13 Claims, 5 Drawing Sheets

(56) References Cited

U.S. PATENT DOCUMENTS

| | | | | |
|---|---|---|---|---|
| 2015/0305834 A1* | 10/2015 | Crafton | ................ | A61C 13/225 |
| | | | | 433/8 |
| 2018/0193110 A1* | 7/2018 | Crouse | .................... | A61C 7/12 |
| 2018/0221111 A1* | 8/2018 | Khouri | .................... | A61C 7/30 |
| 2019/0321136 A1* | 10/2019 | Martz | ...................... | A61C 7/08 |
| 2020/0352682 A1* | 11/2020 | Voudouris | .............. | A61C 7/285 |
| 2021/0007830 A1 | 1/2021 | Roein Peikar et al. | | |
| 2021/0068929 A1 | 3/2021 | Norris | | |
| 2021/0106408 A1* | 4/2021 | Dosda | ...................... | A61C 7/20 |
| 2021/0401547 A1* | 12/2021 | Voudouris | .............. | A61C 7/282 |

OTHER PUBLICATIONS

International Search Report and Written Opinion; PCT/US2022/022146; mailed Jun. 10, 2022.

* cited by examiner

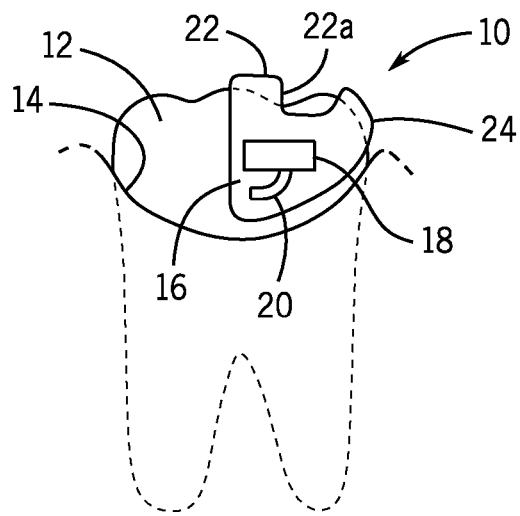
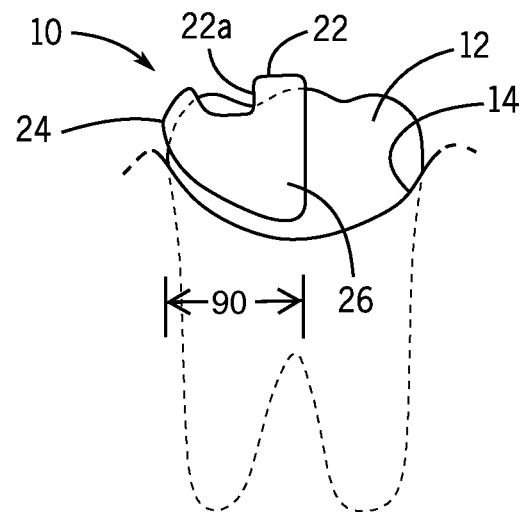
FIG. 1  FIG. 2
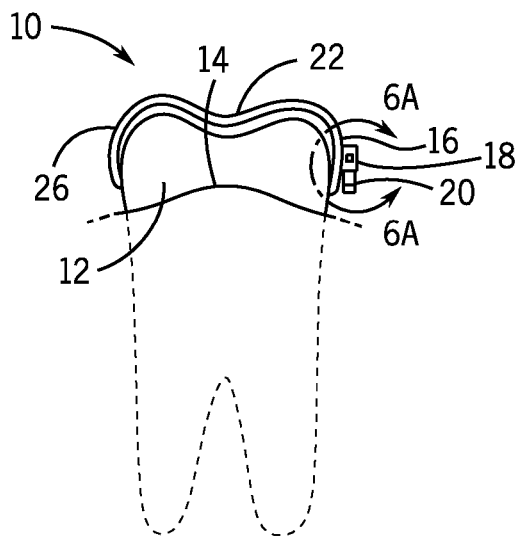
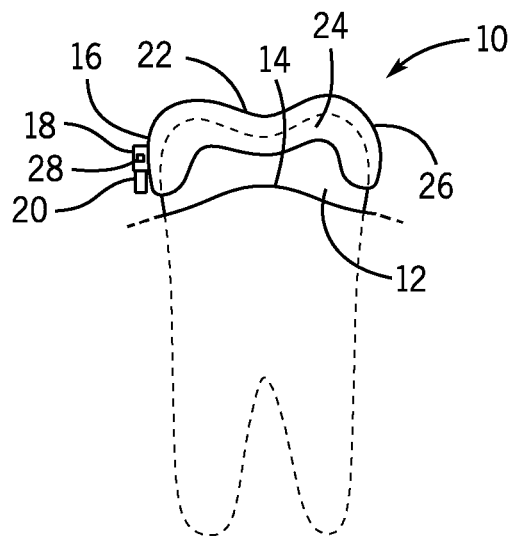
FIG. 3  FIG. 4
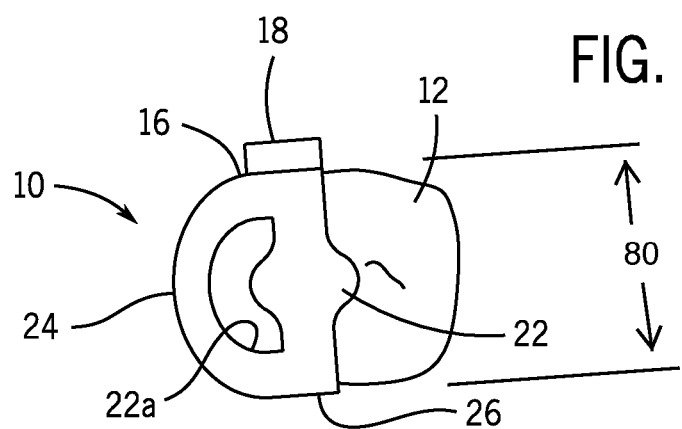
FIG. 5

ORTHODONTIC HYBRID BRACKET

BACKGROUND OF THE INVENTION

The present invention relates to the dental arts and more particularly, to an orthodontic hybrid bracket.

Attachment of orthodontic appliances to first and/or second molars is often inhibited or prevented by the presence of gingival tissue on or along a portion of the distal surface of the molar. Attachment in these cases causes extreme discomfort to the patient and/or requires a surgical procedure to eliminate the gingival tissue in this area.

Typical appliance attachment methods include bands, crowns, and ROCs (removed occlusal crowns). Current orthodontic bands and crowns encircle the molar and impinge gingival tissue particularly on the distal aspect of the tooth. In short, each of these fixed appliances encroach on the retromolar gingival tissue causing discomfort to the patient.

Thus, while these methods are adequate for fully erupted molars, partially erupted molars on younger orthodontic patients are a challenge with the current devices as they inflict pain. For younger patients, already apprehensive of the procedure, this pain can be a dealbreaker or a constant source of complaints throughout the patient's treatment plan.

Accordingly, there is a need for an orthodontic hybrid bracket that does not impinge on the retromolar gingiva simply by not extending to the distal of the molar, thereby eliminating unwanted pain to the patient yet allowing for attachment to molars that are not fully erupted. Moreover, the present invention provides a more comfortable procedure for the patient and eliminates the need for soft tissue surgery.

SUMMARY OF THE INVENTION

In one aspect of the present invention, an orthodontic bracket providing a buccal portion and a lingual portion opposite the buccal portion, the buccal portion and the lingual portion defining a length 80 (as shown in FIG. 5) of the bracket; a mesial connector interconnecting the buccal portion and the lingual portion; and a distance extending orthogonal to the length defines a width 90 (as shown in FIG. 2) of the bracket, wherein the distance extends a distal direction from the most proximal end of the mesial connector, wherein the width is dimensioned to end proximal of a distal surface of a posterior tooth.

In another aspect of the present invention, the buccal portion of the orthodontic bracket is adapted to be adjacent to a buccal surface of the posterior tooth, wherein the lingual portion is adapted to be adjacent to a lingual surface of the posterior tooth, and wherein the mesial connector is adapted to be adjacent to a mesial surface of the posterior tooth, wherein the buccal portion comprises a buccal bonding pad, wherein the lingual portion comprises a lingual bonding pad; and further providing an occlusal connector interconnecting the buccal portion and the lingual portion, wherein an occlusal window is defined between the occlusal connector and the mesial connector; and further providing a buccal tube connected to the buccal portion, wherein the buccal tube comprises one or more circumscribed archwire slots, wherein the buccal tube comprises an elastic hook, and wherein the buccal tube comprises a headgear tube or lip bumper tube and/or the orthodontic bracket has a lingual sheath attachment connected to the lingual portion.

These and other features, aspects and advantages of the present invention will become better understood with reference to the following drawings, description, and claims.

BRIEF DESCRIPTION OF THE DRAWINGS

FIG. 1 is a side elevation view of an exemplary embodiment of the present invention illustrating the buccal surface of a molar.

FIG. 2 is a side elevation view of an exemplary embodiment of the present invention illustrating the lingual surface of a molar.

FIG. 3 is a side elevation view of an exemplary embodiment of the present invention illustrating the distal surface of a molar.

FIG. 4 is a side elevation view of an exemplary embodiment of the present invention illustrating the mesial surface of a molar.

FIG. 5 is a top plan view of an exemplary embodiment of the present invention illustrating the occlusal surface of a molar.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an orthodontic hybrid bracket having a body dimensioned and adapted to engage a plurality of surfaces of a posterior tooth, wherein the body terminates proximal of the distal surface of the posterior tooth.

Figure 6A:
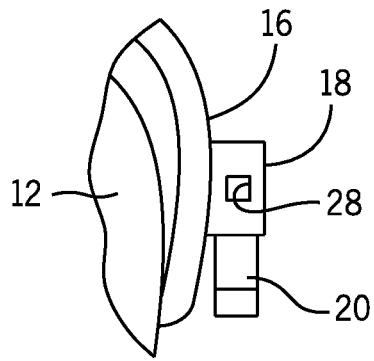
FIG. 6A is a detail view of an exemplary embodiment of the present invention taken along line 6A-6A of FIG. 3.
Figure 6B:
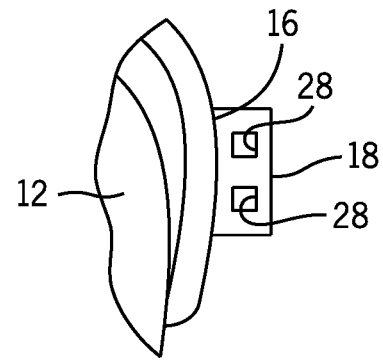
FIG. 6B is a detail view similar to FIG. 6A.
Figure 6C:
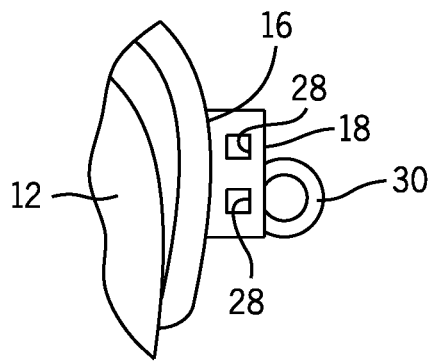
FIG. 6C is another detail view similar to FIG. 6A.
Figure 6D:
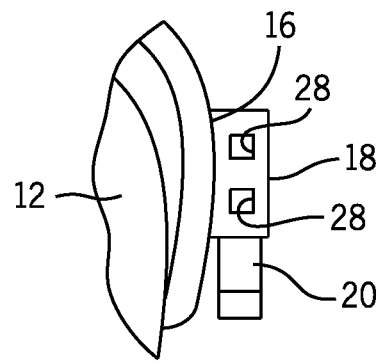
FIG. 6D is yet another detail view similar to FIG. 6A.
Figure 7:
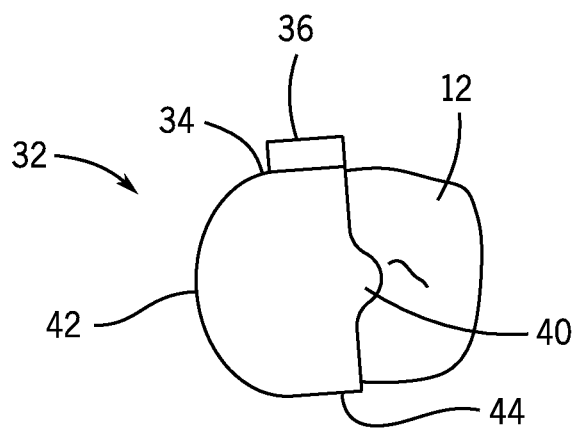
FIG. 7 is a top plan view of an exemplary embodiment of the present invention illustrating the occlusal surface of a molar.
Figure 8:
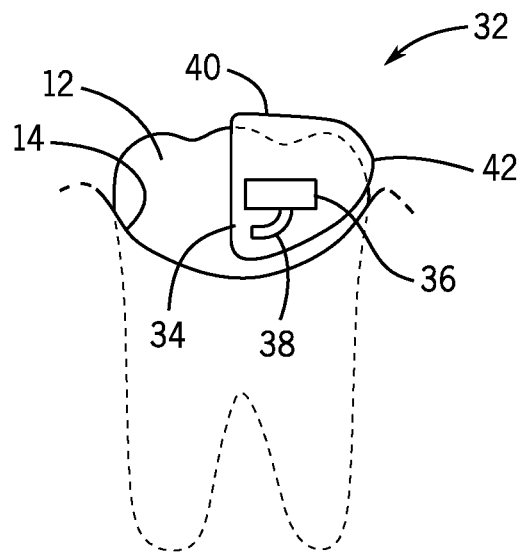
FIG. 8 is a side elevation view of an exemplary embodiment of the present invention illustrating the buccal surface of a molar with the bracket in a supragingival configuration.
Figure 9:
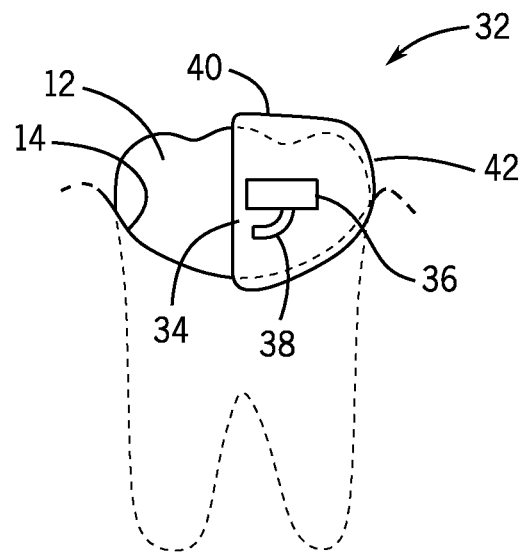
FIG. 9 is a side elevation view of an exemplary embodiment of the present invention illustrating the buccal surface of a molar with the bracket in a subgingival configuration.
Figure 10:
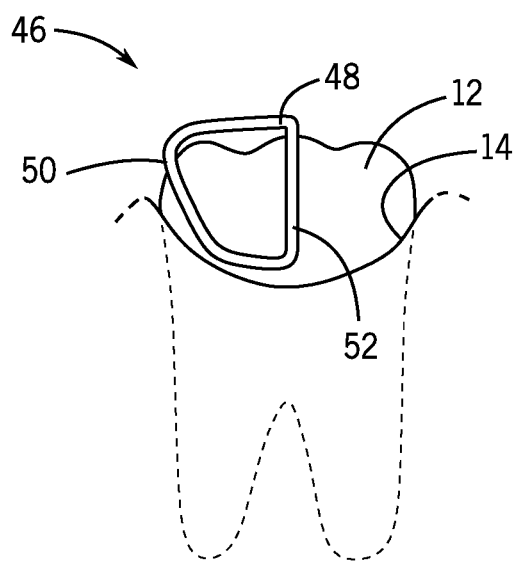
FIG. 10 is a side elevation view of an exemplary embodiment of the present invention illustrating the lingual surface of a molar with the bracket in a supragingival configuration.
Figure 11:
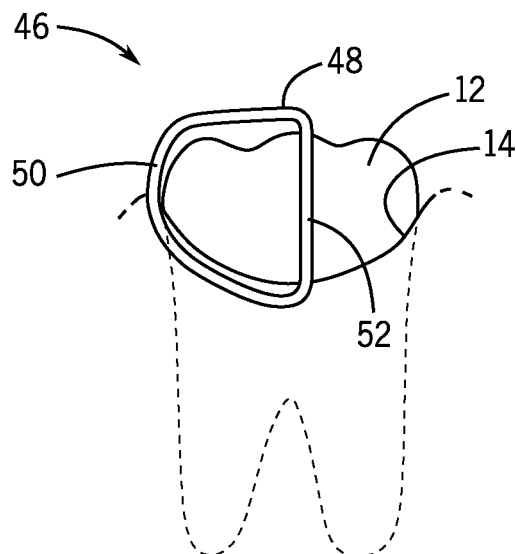
FIG. 11 is a side elevation view of an exemplary embodiment of the present invention illustrating the lingual surface of a molar with the bracket in a subgingival configuration.
Figure 12:
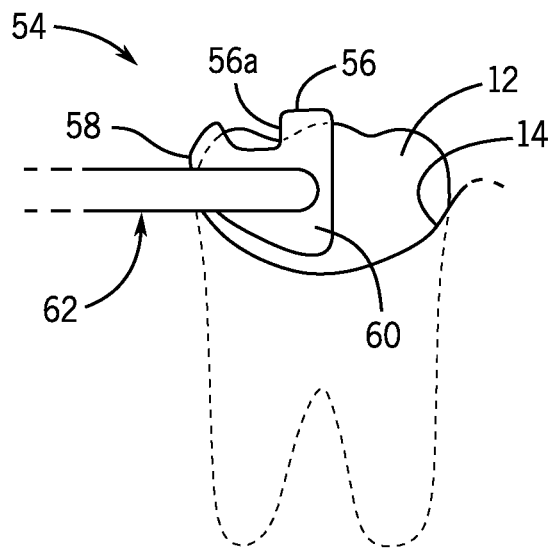
FIG. 12 is a side elevation view of an exemplary embodiment of the present invention illustrating the lingual surface of a molar with a connected appliance.
Figure 13:
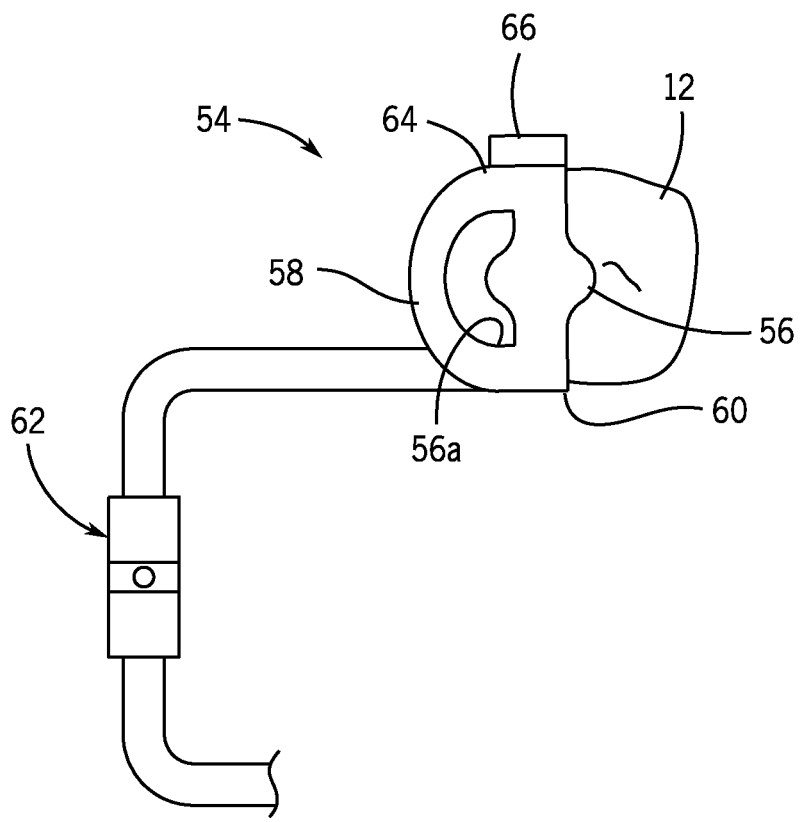
FIG. 13 is a top plan view of an exemplary embodiment of the present invention with a connected appliance.
Figure 14:
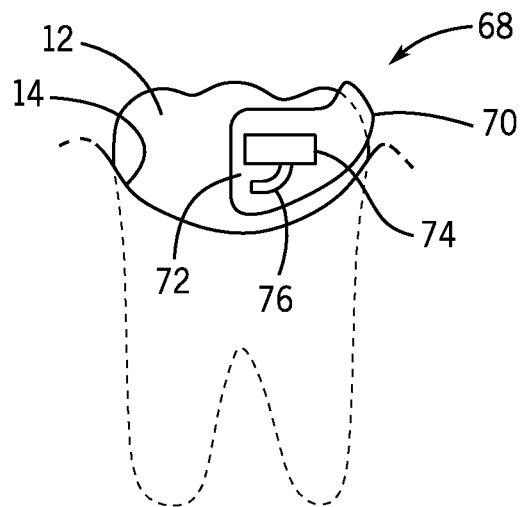
FIG. 14 is a side elevation view of an exemplary embodiment of the present invention illustrating the buccal surface of a molar.
Figure 15:
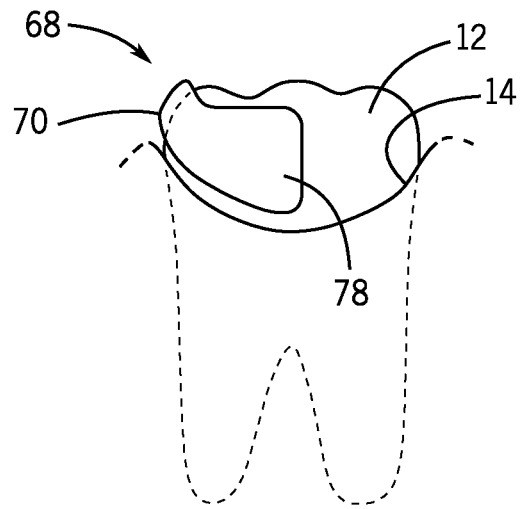
FIG. 15 is a side elevation view of an exemplary embodiment of the present invention illustrating the lingual surface of a molar.
Figure 16:
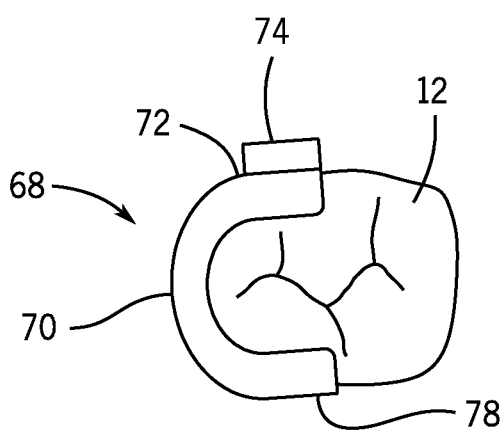
FIG. 16 is a top plan view of an exemplary embodiment of the present invention.

Referring to FIGS. 1 through 16, the present invention may include a plurality of orthodontic hybrid brackets 10, 32, 46, 54, 68. Each orthodontic hybrid bracket 10, 32, 46, 54, 68 is dimensioned and adapted to engage the non-distal surfaces of a posterior tooth 12. Each orthodontic hybrid bracket 10, 32, 46, 54, 68 has a buccal bonding pad 16, 34, 64, 72 and a lingual bonding pad 26, 44, 52, 60, 78 bridged by an occlusal connector 22, 40, 48, 56 and/or a mesial connector 24, 42, 50, 58, 70, respectively. In certain embodiments, an occlusal window 22a and 56a may be defined between the occlusal connector 22, 56 and the adjacent mesial connector 24, 58. It should be understood that the dental terms buccal, lingual, mesial, distal, and occlusal indicates the location of the associated component relative the posterior tooth 12; specifically, that the associated component is adjacent to that portion of the posterior tooth 12.

In certain embodiments, a buccal tube 18, 36, 66, and 74 may be disposed along the buccal bonding pad 16, 34, 64, 72, respectively. Each buccal tube 18, 36, 66, and 74 may provide one or more slots 28 (circumscribed by the body of the buccal tube 18, 36, 66, and 74) and a hook 20, 38, 76 and/or an auxiliary tube such as a headgear tube or lip bumper tube 30. The slots 28 may be an archwire slot or multiple auxiliary archwire slots; likewise, the hook 20, 38, 76 and/or the auxiliary tube 30 is dimensioned and adapted to engage auxiliary orthodontic appliances and/or elastics (not shown).

The lingual bonding pad 26, 44, 52, 60 and 78 could have a lingual sheath attachment that would allow for attachment points for removable metal appliance components. The occlusal connector 22, 40, 48, 56 could be omitted, however strength would be diminished. The mesial connector 24, 42, 50, 58 and 70 could be omitted if the occlusal connector 22, 40, 48, 56 is present, however the strength would also be diminished. The mesial connector 24, 42, 50, 58, 70 could extend to the subgingival level or a supragingival level. The lingual bonding pad 26, 44, 52, 60, 78 and the buccal bonding pad 16, 34, 64, 72 could also extend to a subgingival level or a supragingival level.

The buccal bonding pad 16, 34, 64, 72, the lingual bonding pad 26, 44, 52, 60, 78, the occlusal connector 22, 40, 48, 56 and the mesial connector 24, 42, 50, 58 and 70 may be adhered to the associated surfaces of the posterior tooth 12 with orthodontic cement/adhesive. As a whole, the present invention functions to adhere the entire orthodontic hybrid bracket 10, 32, 46, 54, and 68 to the posterior tooth 12 without interfacing with the distal surface of the posterior tooth 12 and thus not impinging on that surface's gingival tissue 14. As tissue impingement is eliminated, the appliance is more comfortable with the patient and easier for the orthodontist to attach.

Additional orthodontic and/or orthopedic appliances such as fixed expanders 62, TPAs, Herbst appliances, MARA appliances, non-compliance correctors, habit appliances, molar distalizing appliances, auxiliary appliances, and space maintainers may be attached to the lingual bonding pad 26, 44, 52, 60, 78 or any of the other elements of the hybrid bracket 10, 32, 46, 54, and 68. The additional orthodontic appliances may be soldered directly to the orthodontic hybrid bracket 10, 32, 46, 54, 68 or it may be configured as a removable connection. The orthodontic hybrid bracket 10, 32, 46, 54, 68 will allow for placement of orthodontic appliances before the complete eruption of the posterior tooth 12.

The present invention may be made by additive or subtractive manufacturing including, but not limited to, computer numerical control (CNC) molding, casting, injection molding, laser sintering, and 3D printing of bracket.

A method of using the present invention may include the following. The orthodontic hybrid bracket 10, 32, 46, 54, 68 disclosed above may be provided. After the posterior tooth 12 is cleaned, it is etched, rinsed, and primed, the orthodontic hybrid bracket 10, 32, 46, 54, 68 would be directly bonded to the posterior tooth 12 with orthodontic adhesive/cement. The orthodontic hybrid bracket 10, 32, 46, 54, 68 would be bonded lingually, buccally, occlusally, and mesially to the posterior tooth 12 for retention and strength.

Many orthodontic and orthopedic appliances may be attached to the orthodontic hybrid bracket such as: palatal expanders, mandibular expanders, habit appliances, space maintenance appliances, mandibular advancement appliances, eruption appliances, braces, and other fixed orthodontic appliances.

As used in this application, the term "about" or "approximately" refers to a range of values within plus or minus 10% of the specified number or, if there is no specified number, is to be construed as indicating a deviation as would be appreciated by one of ordinary skill in the art to operate satisfactorily for an intended purpose. The term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein. Though it is also understood that ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary. Directional terms, specifically, may be construed through reference to the elevation Figures, where the term "upward" is directed toward the upper margin of the relevant figure, and the term "downward" is directed to the lower margin of the relevant figure.

It should be understood, of course, that the foregoing relates to exemplary embodiments of the invention and that modifications may be made without departing from the spirit and scope of the invention as set forth in the following claims.

What is claimed is:

1. An orthodontic bracket for a single tooth, the orthodontic bracket comprising:
a buccal portion and a lingual portion opposite the buccal portion, the buccal portion and the lingual portion defining a length of the bracket, wherein the length of the bracket is approximately a bucco-lingual width of the single tooth;
an occlusal connector interconnecting the buccal portion and the lingual portion by extending over and spaced apart from an occlusal surface of the single tooth, wherein a distal_most edge, relative to a mesial surface of the single tooth, of each of the buccal portion, the lingual portion, and the occlusal connector terminates approximately halfway between the distal and mesial surfaces of the single tooth.

2. The orthodontic bracket of claim 1, wherein the buccal portion is configured to be adjacent to a buccal surface of the single tooth, wherein the lingual portion is configured to be adjacent to a lingual surface of the single tooth, and wherein a mesial connector is configured to be adjacent to the mesial surface of the tooth as the mesial connecter extends from the buccal portion and the lingual portion.

3. The orthodontic bracket of claim 2, wherein an occlusal window is circumscribed between the occlusal connector and the mesial connector, wherein the occlusal window is adjacent the occlusal surface of the single tooth.

4. The orthodontic bracket of claim 1, wherein the buccal portion comprises a buccal bonding pad.

5. The orthodontic bracket of claim 1, wherein the lingual portion comprises a lingual bonding pad.

6. The orthodontic bracket of claim 1, wherein the buccal portion and the lingual portion directly contact a buccal surface and a lingual surface, respectively, of the single tooth.

7. The orthodontic bracket of claim 1, further comprising a buccal tube connected to the buccal portion.

8. The orthodontic bracket of claim 7, wherein the buccal tube comprises one or more circumscribed archwire slots.

9. The orthodontic bracket of claim 8, wherein the buccal tube comprises an elastic hook.

10. The orthodontic bracket of claim 1, further comprising a lingual sheath attachment connected to the lingual portion.

11. The orthodontic bracket of claim 1, wherein said distal_most edges do not interface the distal surface of the single tooth.

12. An orthodontic bracket for a single tooth, comprising:
a buccal portion and a lingual portion opposite the buccal portion, the buccal portion and the lingual portion defining a length of the bracket, wherein the length of the bracket is approximately a bucco-lingual width of the single tooth; and
a width of the bracket extends orthogonal to the length of the bracket,
wherein a distal_most edge, relative to a mesial surface of the single tooth, of the width terminates approximately two-thirds or less of a distance between the distal and mesial surfaces of the single tooth, and
wherein a mesial edge of the width is distal of a mesial surface of the tooth.

13. An orthodontic bracket for a single tooth, the orthodontic bracket comprises one or more portions thereof that directly engages one of a buccal surface, a lingual surface, and a mesial surface of the tooth without interfacing a distal surface of the single tooth.

* * * * *